US006253779B1

(12) United States Patent
Nanaji et al.

(10) Patent No.: US 6,253,779 B1
(45) Date of Patent: Jul. 3, 2001

(54) BLENDING SYSTEM AND METHOD USING AN AUXILIARY MEASURING DEVICE

(75) Inventors: Seifollah S. Nanaji; John S. McSpadden, both of Greensboro, NC (US)

(73) Assignee: Masconi Commerce Systems Inc., Greensboro, NC (US)

( * ) Notice: Subject to any disclaimer, the term of this patent is extended or adjusted under 35 U.S.C. 154(b) by 0 days.

(21) Appl. No.: 09/248,956

(22) Filed: Feb. 12, 1999

(51) Int. Cl.$^7$ ................................................. G05D 11/13
(52) U.S. Cl. ................................. 137/3; 137/9; 137/88; 137/101.19; 137/101.21
(58) Field of Search ................................ 137/88, 101.19, 137/101.21, 3, 9

(56) References Cited

U.S. PATENT DOCUMENTS

| 3,036,585 | * | 5/1962 | Shawhan | 137/101.19 |
| 3,219,046 | * | 11/1965 | Waugh | 137/101.19 X |
| 3,751,644 | | 8/1973 | Mayer | 235/151 |
| 3,864,095 | | 2/1975 | Sinclair et al. | 44/2 |
| 3,999,959 | | 12/1976 | Bajek | 44/2 |

(List continued on next page.)

FOREIGN PATENT DOCUMENTS

| 0 572 621 B1 | 12/1993 | (EP) . |
| 0 723 929 A1 | 7/1996 | (EP) . |
| WO 98/15457 | 4/1998 | (WO) . |
| WO 99/26876 | 6/1999 | (WO) . |

OTHER PUBLICATIONS

"Error integration gives greater accuracy in analogue blending", Ken Jackson, Process Engineering, May 1971.*
Sentech Industries, Inc.; Veturi Flowmeter, date believed to be at least as early as Sep. 24, 1998.

Sentech Industries, Inc.; Differential Pressure Gauge, date believed to be at least as early as Sep. 24, 1998.

Sentex/Monitek information; date believed to be at least as early as Sep. 24, 1998.

*Primary Examiner*—Stephen M. Hepperle
(74) *Attorney, Agent, or Firm*—Withrow & Terranova PLLC (57) ABSTRACT

A system for blending two-blend components to form a blended final product including a first supply line for supplying a first blend component at a first flow rate and a second supply line for supplying a second blend component at a second flow rate. The first supply line and the second supply line intersect to form a blended product line. The system further includes a blended product measuring device positioned in the blended product line for measuring the flow rate of the blended product and an auxiliary measuring device positioned in the first supply line for measuring the flow rate of the first blend component. The auxiliary measuring device may have a degree of accuracy less than that of the blended product meter. Alternatively, the auxiliary measuring device may have the same level of accuracy as that of the blended product meter. A calculation device determines the flow rate of the second blend component by measuring the difference between the flow rates measured by the blended product meter and the auxiliary measuring device. A method for determining the inputs to a blending system for blending a first blend component and a second blend component to form a blended mixture. The method includes measuring the flow rate of the blended mixture directly using a blended mixture flow meter and measuring the flow rate of the first blend component directly using an auxiliary measuring device having substantially less accuracy than that of the blended product flow meter. The flow rate of the second blend component is determined by measuring the difference between the blended mixture flow rate and the first blend component flow rate.

30 Claims, 3 Drawing Sheets

U.S. PATENT DOCUMENTS

| | | | |
|---|---|---|---|
| 4,223,807 | 9/1980 | Caswell et al. | 222/28 |
| 4,251,870 | 2/1981 | Jaffe | 364/500 |
| 4,324,294 * | 4/1982 | McLoughlin et al. | 137/101.21 X |
| 4,876,653 | 10/1989 | McSpadden | 364/479 |
| 4,930,347 | 6/1990 | Henderson | 73/189 |
| 4,963,745 | 10/1990 | Maggard | 250/343 |
| 4,978,029 | 12/1990 | Furrow et al. | 222/1 |
| 5,018,645 | 5/1991 | Zinsmeyer | 222/14 |
| 5,029,100 | 7/1991 | Young et al. | 364/479 |
| 5,038,971 | 8/1991 | Gayer et al. | 222/1 |
| 5,125,533 | 6/1992 | Gayer et al. | 222/28 |
| 5,139,045 | 8/1992 | Ensign | 137/114 |
| 5,203,384 | 4/1993 | Hansen | 141/59 |
| 5,223,714 | 6/1993 | Maggard | 250/343 |
| 5,225,679 | 7/1993 | Clarke et al. | 250/343 |
| 5,231,877 | 8/1993 | Henderson | 73/204 |
| 5,246,026 * | 9/1993 | Proudman | 137/3 |
| 5,257,720 | 11/1993 | Wulc et al. | 222/20 |
| 5,310,449 | 5/1994 | Henderson | 156/628 |
| 5,412,581 | 5/1995 | Tackett | 364/498 |
| 5,447,062 | 9/1995 | Kopl et al. | 73/261 |
| 5,469,830 | 11/1995 | Gonzalez | 123/515 |
| 5,569,922 | 10/1996 | Clarke | 250/339 |
| 5,606,130 | 2/1997 | Sinha et al. | 73/627 |
| 5,630,528 | 5/1997 | Nanaji | 222/1 |
| 5,706,871 | 1/1998 | Andersson et al. | 141/59 |
| 5,746,238 * | 5/1998 | Brady et al. | 137/3 |
| 5,757,664 | 5/1998 | Rogers et al. | 364/509 |

* cited by examiner

BLENDING SYSTEM AND METHOD USING AN AUXILIARY MEASURING DEVICE

FIELD OF THE INVENTION

The present invention relates to liquid blending systems and, in particular, to a system for blending two liquid blend components using the combination of a highly accurate meter and a substantially less accurate auxiliary measuring device.

BACKGROUND OF THE INVENTION

A number of systems are known for blending and dispensing two-blend components to form at least one blended final product. Alternatively, the systems dispense several blended products made up of differing amounts of each of the blend components. Typically, the control devices for these systems require measuring the flow rate and/or cumulative volume of each of the blend components so that a proper amount of each may be added to the blending process to create a desired final product.

Blending systems used for commercial applications with retail customers must conform to government-mandated regulations concerning the accuracy of the measured quantity and the quality of the dispensed product. Meeting these tight measurement tolerances for applications, such as service station fuel dispensing, requires a highly accurate meter having an accuracy of much less than plus or minus one percent. Measuring devices capable of meeting these standards can be expensive and with blending components, this cost is multiplied by the number of components. Thus, it would be desirable to have an alternative blend component measurement system that minimizes the need for costly precision meters. Desirably, such a system would be fully retrofitable into existing blending systems. The present invention addresses this need.

SUMMARY OF THE INVENTION

The present invention provides for more economical fluid blending systems by reducing the required number of highly accurate meters. Rather than measure the flow rate and/or volume or individual blend components using costly, highly accurate measuring devices, the present invention relies on the combination of a single such measuring device and a substantially less accurate auxiliary measuring device. Thus, the flow rate of one of the blending components is measured directly, while the flow rate of the other blend component is calculated indirectly. The present invention provides these technical and economic benefits, while still meeting weights and measures requirements for accuracy.

The present invention relates to a system for blending two-blend components to form a blended final product including a first supply line for supplying a first blend component at a first flow rate and a second supply line for supplying a second blend component at a second flow rate. The first supply line and the second supply line intersect to form a blended product line. The system further includes a blended product measuring device or meter positioned in the blended product line for measuring the flow rate of the blended product, and an auxiliary measuring device positioned in the first supply line for measuring the flow rate of the first blend component. A calculation device determines the flow rate of the second blend component by measuring the difference between the flow rates measured by the blended product meter and the auxiliary measuring device.

In a preferred embodiment, the auxiliary measuring device has a degree of accuracy less than that of the blended product measuring device. Desirably, the blended product measuring device has an accuracy of about 0.25 percent and the auxiliary measuring device has an accuracy of about 1.0 percent. Alternatively, the auxiliary measuring device may have an accuracy between about 0.75 percent and about 1.0 percent. In an alternative embodiment, the blended product measuring device and the auxiliary measuring device have substantially the same level of accuracy.

The present invention further relates to a method for blending two-blend components to form a blended final product, including mixing a first blend component flow and a second blend component flow to form a desired blended product flow; measuring the flow rate of the blended product flow with a blended product meter; and measuring the flow rate of the first blend component flow using an auxiliary measuring device. The auxiliary measuring device may have substantially less accuracy as than that of the blended product meter. Alternatively, the auxiliary measuring device may have substantially the same accuracy as that of the blended product meter. The flow rate of the second blend component is determined by measuring the difference between the flow rates measured by the blended product meter and the auxiliary measuring device. The blending process is carried out by controlling the flow rates of the first and second blend components to create the desired blended final product using the measured first product flow rate and the determined second product flow rate.

Yet another embodiment of the present invention relates to a method for determining the inputs to a blending system for blending a first blend component and a second blend component to form a blended mixture. The method includes measuring the flow rate of the blended mixture directly at a first level of measurement accuracy and measuring the flow rate of the first blend component directly at a second level of measurement accuracy. The flow rate of the second blend component is determined by measuring the difference between the blended mixture flow rate and the first blend component flow rate. The auxiliary measuring device may have substantially the same or substantially less accuracy than that of the blended product flow meter.

These and other aspects of the present invention will become apparent to those skilled in the art after a reading of the following description of the preferred embodiments, when considered in conjunction with the drawings. It should be understood that both the foregoing general description and the following detailed description are exemplary and explanatory only and are not restrictive of the invention as claimed. The accompanying drawings, which are incorporated in and constitute a part of this specification, illustrate one embodiment of the invention and, together with the description, serve to explain the principles of the invention.

BRIEF DESCRIPTION OF THE DRAWINGS

The above and other features and advantages of the present invention, will become more apparent and will be readily appreciated from the following detailed description of the preferred embodiments of the invention, taken in conjunction with the accompanying drawings, in which.

DETAILED DESCRIPTION OF THE PREFERRED EMBODIMENT

Figure 1:
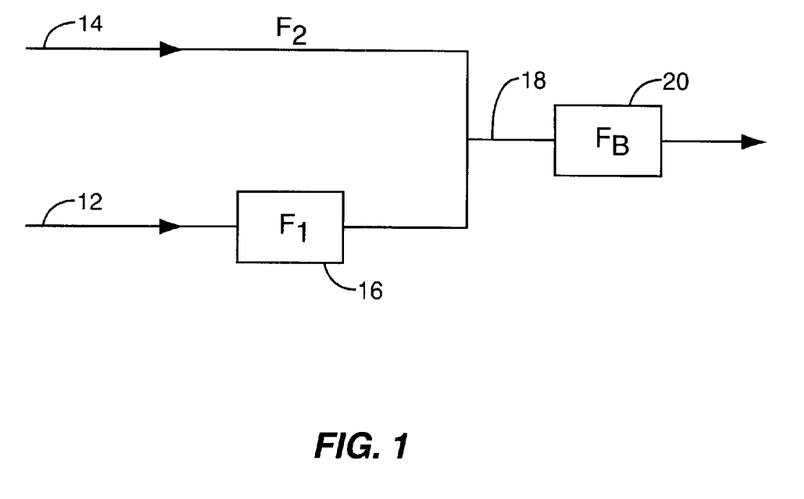
FIG. 1 is a schematic representation of the principle of operation of the present invention showing first and second supply lines feeding into a common line and then into a blended product meter.
Figure 2:
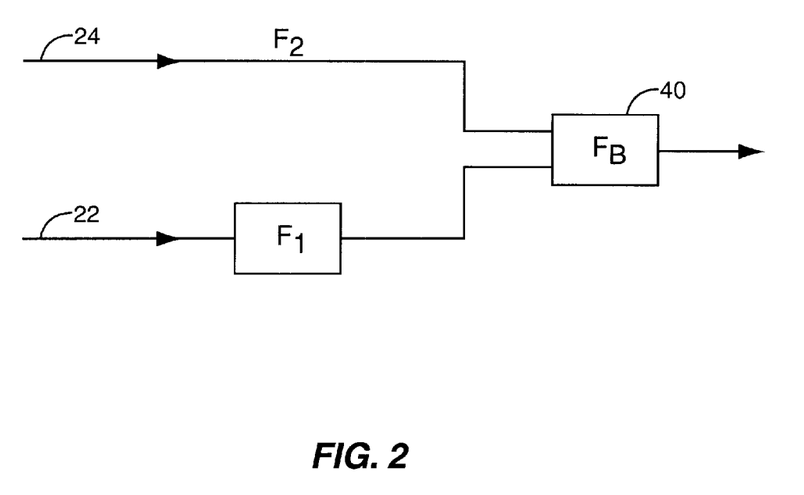
FIG. 2 is a schematic representation of an alternative embodiment of the present invention wherein first and second supply lines for supplying first and second blend components feed directly into a metering device that mixes and meters the blended product.

FIGS. 1 and 2 illustrate the basic operating principle of the present invention. Referring first to FIG. 1, there is illustrated schematically a first supply line 12 and a second supply line 14 for supplying first and second blend components respectively to a common line 18, wherein the blend components are mixed to form a blended product. The blended product is measured by meter 20 which is capable of measuring the volume of blended product created and may also measure, using well known techniques, the flow rate of the blended product. Because the present invention is adaptable to a wide variety of blending system approaches, both volume and flow rate may be referred to hereinafter using the term "throughput." It should be understood that this term refers to whichever one of volume or flow rate that a particular blending system approach controls and/or measures. Thus, any reference herein to "flow rate" could be equally applicable to "volume" and vice versa.

The first supply line 12 includes an auxiliary measuring device (AMD) 16 which measures the flow $F_1$ of the first blend component. Because of conservation of mass principles, the total volume and flow rate entering this blending system via first and second supply lines 12, 14 must equal that of the blended product $F_B$. This principle can be represented mathematically in this instance by the following equation:

$$F_1 + F_2 = F_B.$$

It follows that the flow of the second blend component in second supply line 14 can be represented as:

$$F_2 = F_B - F_1.$$

The above equations illustrate that the flow in the second supply line 14 may be determined mathematically at any time if the flow of the blended product $F_B$, and the flow in the first supply line 12 are known. Thus, it is possible to determine three flow rates using only two measuring devices.

An alternative embodiment of this principle is illustrated in FIG. 2 wherein first and second supply lines 22, 24 feed directly into a blended product measuring device 40. This measuring device 40 serves to measure the quantity of blended product created and also acts as a mixing point for the first and second blend components. The selection of either of the approaches illustrated in FIGS. 1 or 2 is a matter of design choice within the ability of one of ordinary skill. These approaches are equivalent for the practice of the present invention.

The present invention includes selecting the accuracy of the AMD 16 relative to that of the blended product meter 20. Because the cost of any measuring device is directly proportional to the device's accuracy, the use of a substantially less accurate but still acceptable AMD to measure the flow of one of the blending components offers the potential for a cost saving.

The present invention thus includes a method for determining the inputs to a blending system for blending a first blend component and a second blend component to form a blended mixture. The method includes measuring the flow rate of the blended mixture directly at a first accuracy level and measuring the flow rate of the first blend component directly at a second accuracy level. The flow rate of the second blend component is determined indirectly by measuring the difference between the blended mixture flow rate and the first blend component flow rate. In a preferred embodiment, the second accuracy level is substantially less than that of the first accuracy level. In an alternative embodiment, the first and second accuracy levels are substantially the same. The first accuracy level can be measured using a blended mixture flow measuring device or meter. The second accuracy level can be measured using some type of AMD. Each embodiment offers advantages as described below.

Relevant governmental regulations addressing the accuracy of commercial measuring devices set rigorous requirements for the quantity of the final blended product delivered to a customer. Thus, a measuring device for a blended product must meet high standards of accuracy. This standard of accuracy need not apply to an AMD used to measure one of the blend components. That is, the blend components need not be measured with an extremely high degree of accuracy so long as the blended product meets advertised quality characteristics, and the quantity delivered is metered accurately to the customer. Previous blending systems have used two highly accurate, and therefore expensive, meters to measure the flow rate and/or volume of the blend components.

Figure 3:
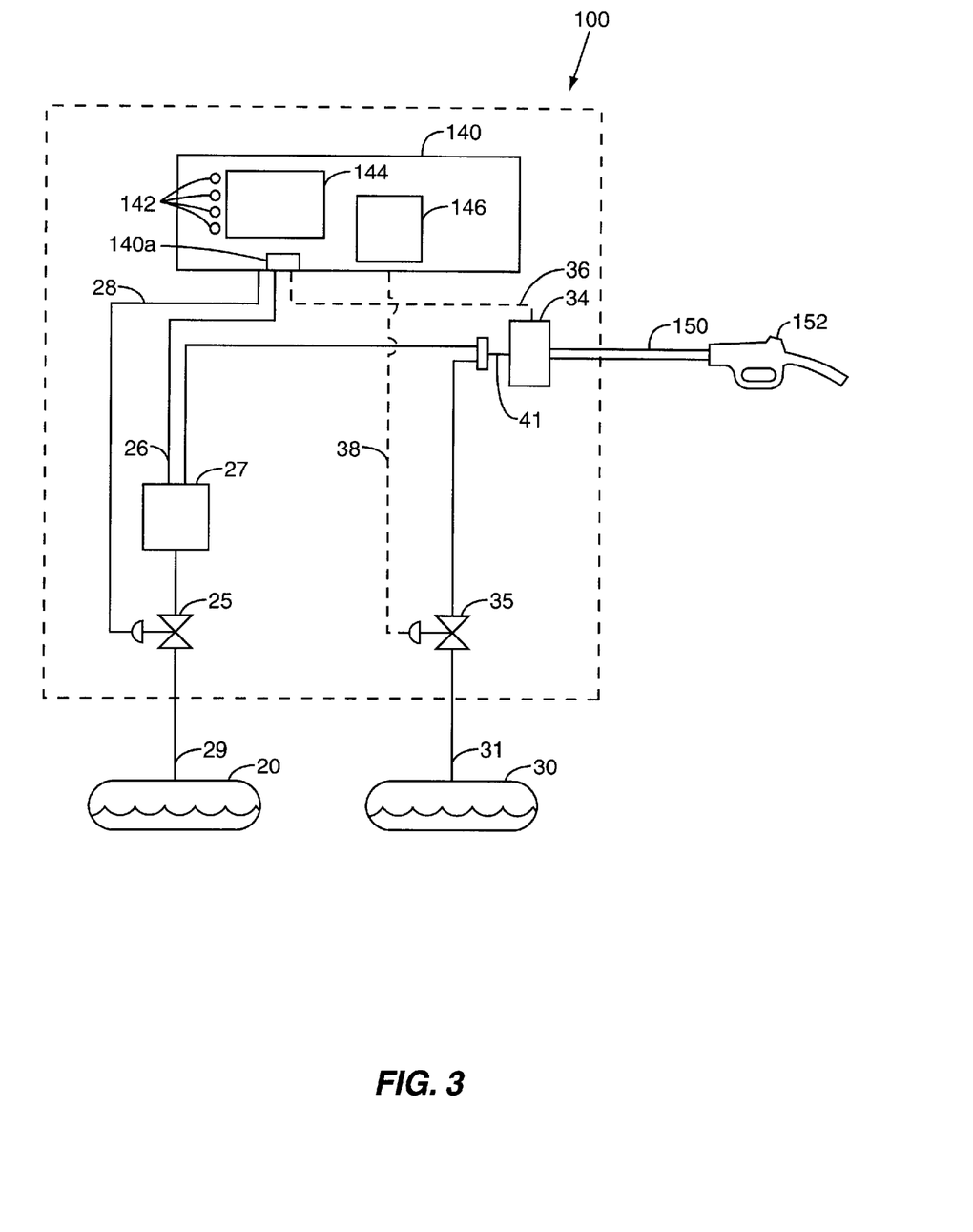
FIG. 3 is a schematic diagram of a fuel dispenser employing the principles of the present invention.

Turning now to FIG. 3, there is illustrated an application of the present invention in the context of a fuel dispensing system. The system includes a fuel dispenser 100 and first and second fuel sources 20, 30 containing first and second fuels. Typically, these first and second fuels are a low octane blend component which may have an octane rating of between about 86 and about 88, and a high octane blend component which may have a octane rating of between about 91 and about 95. Desirably, these components are blended to create at least one, and sometimes multiple blended fuel products, having octane levels intermediate those of the high octane and low octane blend components.

First and second fuel sources 20, 30 are in fluid communication with first and second valves 25, 35 respectively, via first supply line 29 and second supply line 31. The operation of valves 25, 35 is controlled by a blending system control device that is part of dispenser electronics 140. Dispenser electronics 140 issues control signals to valve 25,35 via lines 28, 38. The first valve 25 discharges to an AMD 27 which determines the flow rate of the first blend component and generates a signal indicative of that flow rate via line 26 to dispenser electronics 140. The throughput of valves 25,35 is blended in blended product discharge line 41 and measured by a blended fuel meter 34 positioned downstream of first and second valves. The blended fuel meter 34 determines the amount of fuel delivered to a customer during a transaction. The meter 34 further determines the flow rate/volume of the blended fuel and generates an throughput indicative thereof via line 36 to dispenser electronics 140. This throughput may be of any type known in the art to include either an analog or digital throughput. In a preferred embodiment, the meter 34 may further include a pulser (not shown) for generating a pulse stream as is conventional in the art. The pulser generates an electronic pulse at every $\frac{1}{1000}$ of a gallon (or comparable metric measure) so that the flow rate of the liquid also dictates the pulse rate of the pulser. Alternatively, blended product discharge line 40 could be eliminated and the throughput of valves 25, 35 could be routed directly to meter 34. Dispenser 100 includes a discharge hose 150 and nozzle 152, as is conventional in the art.

Dispenser electronics 140 includes customer displays 144, 146 for indicating the quantity and price of product dispensed and, alternatively, the octane level of that product. The customer selects the product to be dispensed using product selection buttons 142.

The overall blending process may be controlled by any blending control system known in the art. These systems include those disclosed in U.S. Pat. No. 4,876,653 to McSpadden et al., the contents of which are incorporated herein by reference. The McSpadden system includes a blend controller programmed with a desired blend ratio and generated idealized flow rates for the high and low octane blend components. These idealized flow rates are compared to the actual blend component flow rates to generate control signals based on the amount of error between the idealized and actual flow rates.

Other systems with which the present invention can cooperate includes those disclosed in U.S. Pat. No. 5,029,100 to Young; U.S. Pat. No. 5,038,971 to Gayer et al; U.S. Pat. No. 5,125,533 to Gayer et al.; and U.S. Pat. No. 5,257,720 to Wulc et al., the content of which are incorporated herein by reference. The Wulc system includes a memory device for generating a residual blend throughput indicative of the blend ratio of a previously selected blended product. A certain amount of this product would reside in a dispenser discharge line at the beginning of a fueling operation. The system further includes a blend controller for receiving the auxiliary measuring device throughput, the calculation device throughput, the memory device throughput, and generating control signals to high and low octane product valves so as to compensate for the previously selected blended product, when the previously selected blended product is different from the desired blended product.

The Gayer system blends a first blend component and a second blend component according to a desired cumulative blend ratio to form a desired blended product. The system blend controller receives the auxiliary measuring device throughput, the calculation device throughput and compares a calculated ratio of the throughputs with the desired cumulative blend ratio to determine a corrected blend ratio. The controller further controls high and low octane blend component valves in accordance with the corrected blend ratio to maintain the actual cumulative blend ratio of the blended product substantially equal to the desired cumulative blend ratio.

The blend controller may further include an accumulator for accumulating the throughput of the auxiliary measuring device and the calculation device. The controller calculates the corrected blend ratio by dividing the throughput of either the auxiliary measuring device or the calculation device by the accumulator throughput.

In the alternative embodiment of the Gayer system, the controller receives the throughput of the auxiliary measuring device, the calculation device and the blended product meter, and controls the operation of the high and low octane blend component valves according to factors proportional, integral and derivative, with respect to the amount of dispensed blended product as determined by the blended product meter so that the amount of the first and second blend components delivered to the blended product discharge line is substantially equal to that needed to produce the desired blended product.

To the extent that these systems require information concerning the volume of a blend component or blended product dispensed at any given time, the present invention may be used to calculate not only flow rate information, but also volume information.

It will be readily understood that the AMD 27 may be installed in either of the incoming blend component lines of a fuel dispenser. The scope of the present invention includes providing a calculation device that determines the difference between the flow rate of the blended fuel and that of either the first or second blend components.

The present invention may be used as an adjunct to the blending systems disclosed above. That is, the present invention is not intended to control the blending process, but to provide the inputs to any currently known or later developed blending system. A separate calculation device 140*a* may be included in dispenser electronics 140 for determining the throughput of the blended fuel and that of the first blend component, and measuring the difference between the parameters measured by the blended product meter 34 and the AMD 27. This measured difference equals the throughput of the second blend component. The calculation device 140*a* may be a hard wired circuit or could be a separate microprocessor programmed to determine the measure difference, or some combination of the two. The calculation device of the present invention thus will be able to provide flow rate/volume information for the first and second blend components to the blending control system. The flow rate for one of these components will have been directly measured and the flow rate for the other of these components will have been calculated as described herein above. Alternatively, this calculation function and/or a calculation device could be integrated into the blending system controller for blending systems built from the ground up with this feature.

Figure 4:
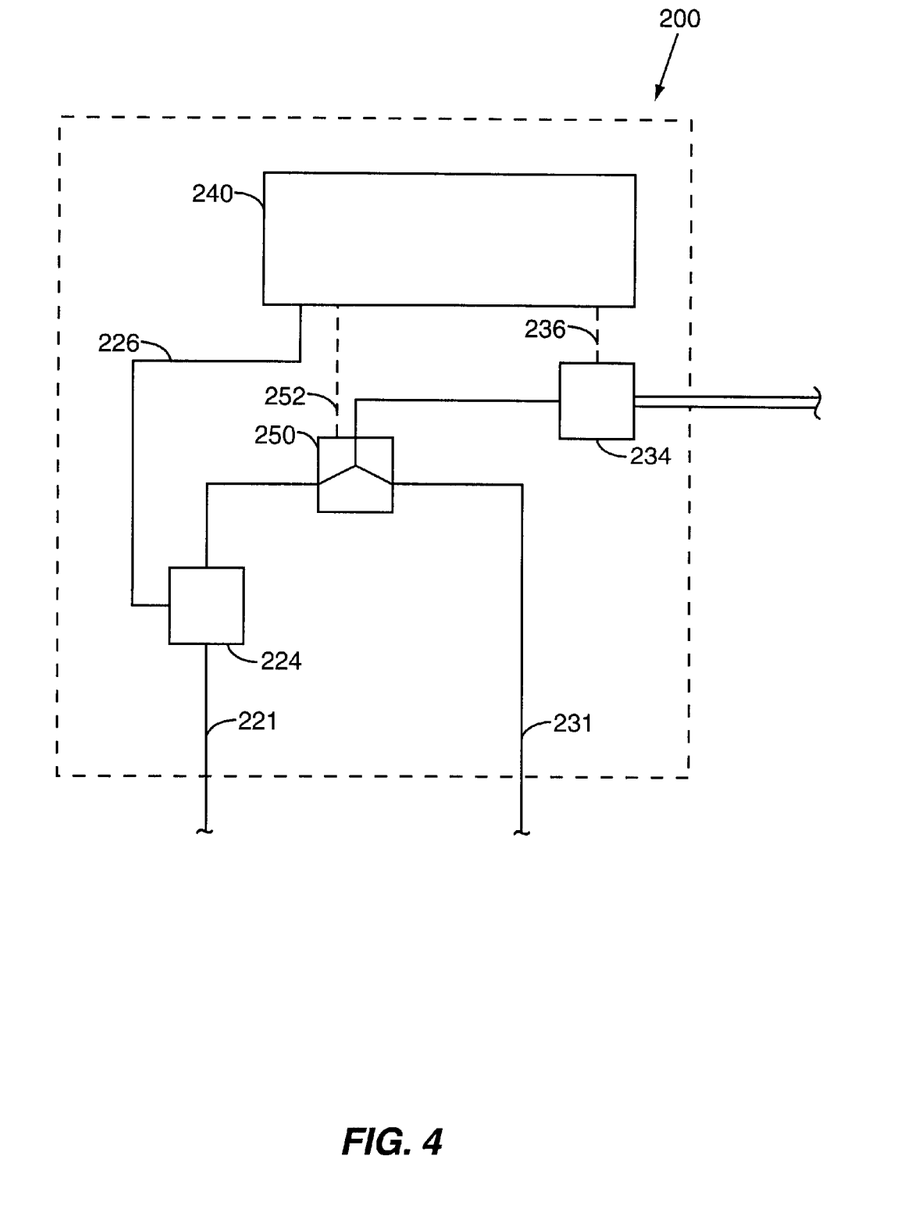
FIG. 4 is a schematic diagram of an alternative fuel dispenser embodiment of the present invention.

An alternative blending dispenser 200 is illustrated in FIG. 4. The dispenser 200 includes first and second supply lines 221, 231 for supplying first and second blend components. An AMD 224 is installed in first supply line 221 and communicates with dispenser controller 240 via signal line 226. Each of the inlet lines is in fluid communication with and is coupled to blend valve 250 whose position is determined by controller 240 via signal line 252. The blend valve 250 serves to mix the first and second blend components and also to proportion the blend components appropriately to produce a desired blended product. A blended product meter 234 is positioned downstream of blend valve 250 for metering the blended product. The blended product meter 234 communicates information regarding product flow rate and volume to dispenser electronics 240 via signal line 236. Dispenser electronics may include a calculation device which receives the throughput of the AMD 224 and the blended product meter 234, and determines the flow rate of the blend component 231 which is not measured by the AMD. As described above, the calculation device determines the difference in flow rates between that of the blended product and that of the blend component measured by the AMD.

Weights and measures requirements for fuel dispensing are set by local authorities that in many countries adopt some version of a published national standard. These standards require that a fuel dispenser display show accurately the actual quantity of fuel dispensed to a customer. That is, the amount of fuel shown on the display must closely match the amount actually provided to the customer. The meter accuracy requirement typically is plus or minus 0.25 percent. This high level of accuracy is met by the relatively expensive blended product meter 34. It is expected that this meter 34 will require periodic checks by weights and measures authorities in accordance with well known practices.

The standards further require that fuel dispensed meet posted octane levels. It is contemplated that this requirement may be met by the combination of a meter meeting the rigorous standard described above, and an AMD 27 having substantially less accuracy. By "substantially less accuracy" it is meant that the AMD does not have the accuracy required to meet applicable weights and measure standards for meter accuracy. Nevertheless, the AMD 27 must have sufficient accuracy to insure that the blended product or products meet published octane levels. Desirably, the AMD 27 may have an accuracy of between about 0.75 percent and about 1.0 percent. The scope of the present invention includes using AMDs having less accuracy, so long as their use with the blended product meter 34 meets posted octane levels.

It is contemplated that an AMD will not require periodic "calibration" checks in the sense that calibration means a calibration test by weights and measures authorities. This device is not being relied upon for ensuring that the quantity of blended product delivered to a customer is accurately measured in accordance with weights and measures regulations. The AMD may require whatever normal maintenance checks are needed to ensure that it is operating properly. These checks could consist of the normal start-up calibration and follow-up maintenance required by the device manufacturer, but these checks will likely be less frequent and less stringent than the checks on the main meter 34. Accordingly, the overall expense will be reduced.

For fuel dispensing applications, any suitable liquid flow measuring device capable of meeting the required accuracy may be used as an AMD. For instance, some type of inferential measuring device may be used. These devices include an ultrasonic flow meter such as a doppler, echo ranging or transit time devices. Alternatively, a turbine meter, propeller device or some type of positive displacement measuring device may be used. Other measuring devices operating on principles such as venturi flow, differential pressure, capacitance, magnetics, or RF admittance may be used. Another suitable measuring device is a vortex shedding meter, available from Fluidyne of Longmont, Colo. Still another measuring device useful for the practice of the present invention is a solid-state microanemometer as disclosed in U.S. Pat. Nos. 4,930,347; 5,231,877; and 5,310,449, all to Henderson, the content of which is incorporated herein by reference. The flow measuring devices disclosed in the Henderson patents are micromachined from a crystal to a shape with four thick external sides that define an outer rectangle. They further include four thin sections that define an inner rectangle and four diagonally directed branches interconnecting the corners of the outer rectangle to the inner rectangle. Four semiconductors resistors located on the four intersections form a sensing bridge. Each external side has a pair of electrical contacts that are electrically interconnected, via conductive leads that extend along the diagonal branches and partially along the intersections, to one of the semiconductor resistors. The physically connected semiconductor resistors and external sides form a rugged, solid-state device. The device provides thermal and electrical isolation of the resistors from each other, thus permitting higher operating temperatures and improved fluid flow sensing capability.

Each of these approaches is interchangeable and equivalent for the purposes of the present invention. Because such a wide variety of flow measurement technologies may be used, the AMD throughput signal may be managed as necessary, depending on the needs of the calculation device used to determine the flow rates of the first and second blend components. Thus, an analog to digital or digital to analog conversion may be accomplished as needed. The scope of the present invention includes using the same type of flow measuring technology for both the blended product meter 34 and the AMD 27. In a preferred embodiment, the AMD 27 may have substantially less accuracy.

Although the present invention has been described as using an AMD having substantially less accuracy than that of the blended fuel measuring device, the scope of the present invention is not limited to that approach. In an alternative embodiment, the AMD and the blended fuel measuring device each may have substantially the same level of accuracy. However, as described above, only the blended fuel measuring device would be relied upon for meeting the regulatory requirements for measurement accuracy. It follows that only the blended fuel measuring device will require periodic, rigorous accuracy validation. The AMD would not require such examination. The cost savings from the avoidance of this requirement are significant because weights and measures testing is time consuming and expensive. Thus, in a preferred embodiment, the AMD will have a level of accuracy substantially less than that of the blended fuel measuring device, and in an alternative embodiment, the AMD will have a level of accuracy substantially equal to that of the blended fuel measuring device. Either of these approaches provides potential cost savings.

It will be readily appreciated that when dispensing an unblended product, that the throughput of the AMD 27 can be ignored. In this instance, the blended fuel meter 34 measures the flow rate and total amount of product dispensed.

The present invention may be integrated seamlessly into existing blending systems which rely on input values of first and second blend component flow rates. The present invention provides that information by measuring one of those flow rates directly and by calculating the other flow rate indirectly. Advantageously, the present invention does so without requiring two highly accurate, expensive meters to measure each flow rate directly. This aspect makes the present invention particularly suitable for retrofit installation in existing fuel dispensers or other types of dispensing systems.

The present invention may also be integrated into fuel dispensing devices previously thought not readily adaptable for blending operation. For example, U.S. Pat. No. 5,630,528, the content of which is incorporated herein by reference, discloses a method and apparatus for dispensing and metering a fluid from a plurality of fluid sources to a single or a plurality of fluid outlets. The invention uses a single meter for measuring the amount of fluid dispensed from each of the fluid outlets. Valves are used at the inlet to and outlet from the meter to control the flow of fluid from a single selected source, to a single outlet intended to dispense fluid from the selected source.

It would not be possible to use the above-described dispensing apparatus for a blending application without loosing the advantage of its single-meter construction. Again, using known blending technology, at least one additional meter would need to be provided to meter a blending component. The present invention enables this dispensing apparatus to be used as a blender through the installation of an AMD in one of the inlet lines to the single meter.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What we claim is:

1. A system for blending two-blend components to form a blended final product comprising:
   a. a first supply line for supplying a first blend component at a first throughput;
   b. a second supply line for supplying a second blend component at a second throughput, wherein the first supply line and the second supply line intersect to form a blended product line;
   c. a blended product measuring device positioned in the blended product line for measuring the throughput of the blended product and generating a signal indicative of such throughput;
   d. an auxiliary measuring device positioned in the first supply line for measuring the throughput of the first blend component, the auxiliary measuring device capable of generating a signal indicative of the first blend component throughput and having a level of accuracy substantially less than that of the blended product measuring device;
   e. a calculation device for determining the throughput of the second blend component by determining the difference between the throughputs measured by the blended product meter and the auxiliary measuring device and generating a signal indicative of that difference; and
   f. a blending controller for receiving the auxiliary measuring device signal and the calculation device signal and controlling the blending of the first and second blend components to form a blended product.

2. A blending system according to claim 1 wherein the blended product measuring device has an accuracy of about 0.25 percent and the auxiliary measuring device has an accuracy of about 1.0 percent.

3. A blending system according to claim 1 wherein the auxiliary measuring device has an accuracy between about 0.75 percent and about 1.0 percent.

4. A blending system according to claim 1 wherein the auxiliary measuring device is selected from the group consisting of ultrasonic flow meters, turbine flow meters, venturi flow meters, differential pressure flow meters, capacitance flow meters, radio frequency flow meters, microanemometers, and magnetics flow meters.

5. An apparatus for determining the flow rates of the blend components of a blended fuel comprising:
   a. a blended fuel meter positioned in fluid communication with the blended fuel for determining the throughput of the blended fuel;
   b. an auxiliary measuring device in fluid communication with a first blend component for measuring the throughput of the first blend component and having a level of accuracy substantially less than that of the blended fuel meter; and
   c. a calculation device for determining the throughput of a second blend component by measuring the difference between the throughputs measured by the blended fuel meter and the auxiliary measuring device.

6. An apparatus according to claim 5 wherein the blended fuel meter has an accuracy of about 0.25 percent and the auxiliary measuring device has an accuracy of about 1.0 percent.

7. An apparatus according to claim 5 wherein the auxiliary measuring device has an accuracy between about 0.75 percent and about 1.0 percent.

8. A method of blending two-blend components to form a desired blended final product comprising:
   a. mixing a first blend component flow and a second blend component flow to form a desired blended product flow;
   b. measuring the throughput of the blended product flow with a blended product meter;
   c. measuring the throughput of the first blend component flow using an auxiliary measuring device wherein the auxiliary measuring device has a level of accuracy substantially less than that of the blended product meter;
   d. determining the throughput of the second blend component by determining the difference between the throughputs measured by the blended product meter and the auxiliary measuring device; and
   e. controlling the throughputs of the first and second blend components to create the desired blended final product using the measured first product throughput and the determined second product throughput.

9. A method according to claim 8 wherein the measuring of the blended product throughput is conducted at an accuracy of about 0.25 percent and the measuring of the first blend component flow rate is conducted at an accuracy of about 1.0 percent.

10. A method according to claim 8 wherein the measuring of the first blend component flow rate is conducted at an accuracy of between about 0.75 percent and about 1.0 percent.

11. A method for determining the inputs to a blending system for blending a first blend component and a second blend component to form a blended mixture comprising:
    a. measuring the flow rate of the blended mixture directly at a first level of measurement accuracy;
    b. measuring the flow rate of the first blend component directly at a second level of measurement accuracy wherein the second level of measurement accuracy is substantially less than that of the first level of measurement accuracy; and
    c. determining the flow rate of the second blend component by measuring the difference between the blended mixture flow rate and the first blend component flow rate.

12. A method according to claim 11 wherein the first level of accuracy is about 0.25 percent and the second level of accuracy is between about 0.75 percent and 1.0 percent.

13. A fuel dispenser for dispensing a blended fuel comprising:
    a. first and second supply lines in fluid communication with first and second blend components respectively;
    b. first and second valves in fluid communication with first and second supply lines, respectively, wherein the first and second valves discharge to blended product discharge line;
    c. a blended fuel meter in fluid communication with the blended product discharge line for generating an output indicative of the throughput of the blended fuel dispensed from the apparatus, wherein the meter includes a pulser for generating an output indicative of the throughput of the blended fuel;
    d. an auxiliary measuring device in fluid communication with one of the blend components for generating an output indicative of the throughput of one of the blend components, wherein the auxiliary measuring device has substantially less accuracy than that of the blended fuel meter;
    e. a blend controller for receiving the auxiliary measuring device output, the blended fuel meter output and calculating the difference between the blended fuel throughput and the throughput of one of the blend components and generating control signals to the first and second valves to maintain the blended fuel octane level within a predetermined range.

14. A fuel dispenser according to claim 13 wherein the blended product measuring device has an accuracy of about 0.25 percent and the auxiliary measuring device has an accuracy of about 1.0 percent.

15. A fuel dispenser according to claim 13 wherein the auxiliary measuring device is selected from the group consisting of ultrasonic flow meters, turbine meters, venturi flow meters, differential pressure flow meters, capacitance flow meters, radio frequency flow meters, microanemometers, and magnetics flow meters.

16. A fuel dispenser for dispensing a blended fuel comprising:
   a. a first blend component supply line;
   b. a second blend component supply line;
   c. a blend valve coupled to the first and second supply lines;
   d. an auxiliary measuring device in fluid communication with the first or second supply lines and positioned upstream of the blend valve wherein the auxiliary measuring device generates an output indicative of the throughput of either the first or second blend components;
   e. a blended fuel meter in fluid communication with the blend valve and a pulser coupled to the blended fuel meter for generating pulses indicative of the throughput of the blended fuel and wherein the auxiliary measuring device has substantially less accuracy than the blended fuel meter;
   f. a blend controller for receiving the auxiliary measuring device output, the blended fuel meter output and calculating the difference between the blended fuel throughput and the throughput of one of the blend components and generating control signals to the blend valves to maintain the blended fuel octane level within a predetermined range.

17. A fuel dispenser according to claim 16 wherein the calculation device is adapted to determine the difference in flow rates between that of the blended fuel and that of the blend component measured by the auxiliary measuring device.

18. An fuel dispenser according to claim 16 wherein the blended product meter has an accuracy of about 0.25 percent and the auxiliary measuring device has an accuracy of about 1.0 percent.

19. An fuel dispenser according to claim 16 wherein the auxiliary measuring device has an accuracy between about 0.75 percent and about 1.0 percent.

20. A fuel dispenser according to claim 16 wherein the auxiliary measuring device is selected from the group consisting of ultrasonic flow meters, turbine meters, venturi flow meters, differential pressure flow meters, capacitance flow meters, radio frequency flow meters, microanemometers, and magnetics flow meters.

21. A system for blending first and second blend components in a desired ratio to form a blended product comprising:
   a. first and second supply lines in fluid communication with first and second blend components respectively;
   b. first and second valves in fluid communication with the first and second supply lines, respectively, wherein the first and second valves discharge to a blended product discharge line;
   c. a blended product meter in fluid communication with the blended product discharge line for generating an output indicative of the throughput of the blended product dispensed from the apparatus;
   d. an auxiliary measuring device mounted in fluid communication with one of the blend components for generating an output indicative of the throughput of one of the blend components, wherein the auxiliary measuring device has substantially less accuracy than that of the blended product meter;
   e. a calculation device for receiving the auxiliary measuring device output and the blended product meter output and generating an output indicative of the difference between the blended product flow rate and the flow rate of one of the blend components; and
   f. a blend controller programmed with the desired blend ratio for receiving the auxiliary measuring device output, the calculation device output and generating idealized first and second flow rate signals corresponding to the desired blend ratio, determining the amount of any error between the actual and ideal flow rates for the blend components, and generating control signals to the first and second valves to compensate for any error between the idealized and the actual flow rates.

22. A system according to claim 21 wherein the blend controller controls the flow rate of the first and second blend components through the first and second valves both simultaneously and independently over different time periods of a dispensing cycle prior to the actual blending of the blend components to compensate for the determined error at any given time.

23. A system for blending first and second blend components according to a desired blend ratio to form a desired blended product comprising:
   a. first and second valves in fluid communication with the first and second blend components, respectively, wherein the first and second valves discharge to a blended product discharge line;
   b. a blended product meter in fluid communication with the blended product discharge line for generating an output indicative of the flow rate of the blended product dispensed from the apparatus;
   c. an auxiliary measuring device in fluid communication with one of the blend components for generating an output indicative of the flow rate of one of the blend components, wherein the auxiliary measuring device has substantially less accuracy than that of the blended product meter;
   d. a calculation device for receiving the auxiliary measuring device output and the blended product meter output and generating an output indicative of the difference between the blended product flow rate and the flow rate of one of the blend components;
   e. a memory device for generating a residual blend output indicative of the blend ratio of a previously selected blended product located in the discharge line;
   f. a blend controller for receiving the auxiliary measuring device output, the calculation device output, the memory device output and generating control signals to the first and second valves so as to compensate for the previously selected blended product when the previously selected blended product is different from the desired blended product.

24. A system for blending a first blend component and a second blend component according to a desired cumulative blend ratio to form a desired blended product comprising:
   a. first and second valves in fluid communication with the first and second blend components, respectively, wherein the first and second valves output to blended product discharge line;
   b. a blended product meter in fluid communication with the blended product discharge line for generating an output indicative of the volume of the blended product dispensed from the apparatus;

c. an auxiliary measuring device in fluid communication with one of the blend components for generating an output indicative of the volume of one of the blend components flowing through the system, wherein the auxiliary measuring device has substantially less accuracy than that of the blended product meter;

d. a calculation device for receiving the auxiliary measuring device output and the blended product meter output and generating an output indicative of the difference between the blended product volume flow and the volume flow of one of the blend components;

e. a blend controller for receiving the auxiliary measuring device output, the calculation device output, and
   i. comparing a calculated ratio of the outputs with the desired cumulative blend ratio to determine a corrected blend ratio; and
   ii. controlling the first and second valves in accordance with the corrected blend ratio to maintain the actual cumulative blend ratio of the blended product substantially equal to the desired cumulative blend ratio.

25. A system according to claim 24 wherein the blend controller further includes an accumulator for accumulating the output of the auxiliary measuring device and the calculation device and wherein the controller calculates the corrected blend ratio by dividing the output of one of the auxiliary measuring device or the calculation device by the accumulator output.

26. A system for the proportional blending of a first blend component and a second blend component to produce a desired blended product comprising:

a. first and second supply lines in fluid communication with sources of the first and second blend components respectively;

b. first and second valves in fluid communication with the first and second supply lines respectively for controlling the amount of first and second blend components provided to the system wherein the first and second valves discharge to a blended product discharge line;

c. a blended product meter in fluid communication with the blended product discharge line for generating an output indicative of the volume of the blended product dispensed from the system;

d. an auxiliary measuring device in fluid communication with one of the blend components for generating an output indicative of the volume of one of the blend components flowing through the first or second supply lines, wherein the auxiliary measuring device has substantially less accuracy than that of the blended product meter;

e. a calculation device for receiving the auxiliary measuring device output and the blended product meter output and generating an output indicative of the difference between the blended product volume flow and the volume flow of one of the blend components;

f. a blend controller for receiving the output of the auxiliary measuring device and the calculation device and the blended product meter, for controlling the operation of the first and second valves according to factors proportional, integral and derivative, with respect to the amount of dispensed blended product as determined by the blended product meter so that the amount of the first and second blend components delivered to the blended product discharge line is substantially equal to that needed to produce the desired blended product.

27. A system for blending two-blend components to form a blended final product comprising:

a. a first supply line for supplying a first blend component at a first flow rate;

b. a second supply line for supplying a second blend component at a second flow rate;

c. a blended product measuring device in fluid communication with the first and second supply lines for measuring the flow rate of the blended product and generating a signal indicative of the blended product flow;

d. an auxiliary measuring device positioned in the first supply line for measuring the flow rate of the first blend component wherein the auxiliary measuring device has a degree of accuracy substantially less than that of the blended product meter, the auxiliary measuring device capable of generating a signal indicative of the first blend component flow rate; and e. a calculation device for determining the flow rate of the second blend component by determining the difference between the flow rates measured by the blended product meter and the auxiliary measuring device, and generating a signal indicative of that difference; and f. a blending controller for receiving the auxiliary measuring device signal and the calculation device signal, and controlling the blending of the first and second blend components to form a blended product.

28. A blending system according to claim 27 wherein the blended product measuring device has an accuracy of about 0.25 percent and the auxiliary measuring device has an accuracy of about 1.0 percent.

29. A blending system according to claim 27 wherein the auxiliary measuring device has an accuracy between about 0.75 percent and about 1.0 percent.

30. A system for blending two-blend components to form a blended final product comprising:

a. a first supply line for supplying a first blend component at a first flow rate;

b. a second supply line for supplying a second blend component at a second flow rate;

c. a blended product measuring device connected to the first and second supply lines for measuring the flow rate of the blended product and generating a signal indicative of the blended product flow;

d. an auxiliary measuring device positioned in the first supply line for measuring the flow rate of the first blend component wherein the auxiliary measuring device has a degree of accuracy substantially less than that of the blended product meter, the auxiliary measuring device capable of generating a signal indicative of the first blend component flow rate; and e. a calculation device for determining the flow rate of the second blend component by determining the difference between the flow rates measured by the blended product meter and the auxiliary measuring device and generating a signal indicative of that difference; and f. a blending controller for receiving the auxiliary measuring device signal and the calculation device signal and controlling the blending of the first and second blend components to form a blended product.

* * * * *

UNITED STATES PATENT AND TRADEMARK OFFICE
CERTIFICATE OF CORRECTION

PATENT NO. : 6,253,779 B1  Page 1 of 1
DATED : July 3, 2001
INVENTOR(S) : Seifollah S. Nanaji and John S. McSpadden It is certified that error appears in the above-identified patent and that said Letters Patent is hereby corrected as shown below:

<u>Title page,</u>
The Assignee name should read "Marconi Commerce Systems Inc."

Signed and Sealed this

Second Day of April, 2002

*Attest:*

JAMES E. ROGAN
*Attesting Officer*  *Director of the United States Patent and Trademark Office*